US009843996B2

(12) United States Patent
Bergström et al.

(10) Patent No.: US 9,843,996 B2
(45) Date of Patent: Dec. 12, 2017

(54) METHOD AND WIRELESS DEVICE FOR MANAGING SELECTION OF WLAN IN A CELL OPERATED BY A 3GPP CELLULAR COMMUNICATION SYSTEM

(71) Applicant: Telefonaktiebolaget L M Ericsson (publ), Stockholm (SE)

(72) Inventors: Mattias Bergström, Stockholm (SE); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 179 days.

(21) Appl. No.: 14/403,158

(22) PCT Filed: Sep. 16, 2014

(86) PCT No.: PCT/SE2014/051066
§ 371 (c)(1),
(2) Date: Nov. 21, 2014

(87) PCT Pub. No.: WO2015/047163
PCT Pub. Date: Apr. 2, 2015

(65) Prior Publication Data
US 2016/0269985 A1    Sep. 15, 2016

Related U.S. Application Data

(60) Provisional application No. 61/883,225, filed on Sep. 27, 2013.

(51) Int. Cl.
*H04W 4/00* (2009.01)
*H04W 48/18* (2009.01)
(Continued)

(52) U.S. Cl.
CPC .......... *H04W 48/18* (2013.01); *H04B 17/318* (2015.01); *H04L 43/16* (2013.01); *H04W 76/02* (2013.01); *H04W 84/12* (2013.01)

(58) Field of Classification Search
CPC ..... H04W 48/18; H04W 76/02; H04W 48/12; H04W 84/12; H04B 17/318; H04L 43/16
See application file for complete search history.

(56) References Cited

U.S. PATENT DOCUMENTS

2010/0003980 A1* 1/2010 Rune .................. H04W 48/16
455/436
2011/0110300 A1    5/2011 Sachs et al.
(Continued)

FOREIGN PATENT DOCUMENTS

WO   WO-2013029672 A1   3/2013
WO   WO-2013127430 A1   9/2013
WO   WO-2013134669 A1   9/2013

OTHER PUBLICATIONS

International Search Report and Written Opinion, Application No. PCT/SE2014/051066, dated Jan. 20, 2015, 18 pages.
3rd Generation Partnership Project; Technical Specification Group Radio Access Network; Study on WLAN/3GPP Radio Interworking (Release 12), 3GPP TR 37.834 V0.3.0 (May 2013), Technical Report, May 2013, 14 pages.
"[81bis#12][Joint/WiFi] Relation of RAN mechanisms to ANDSF", May 20-24, 2013, 20 pages, 3GPP TSG-RAN WG2 Meeting #82, R2-132111, Huawei, Fukuoka, Japan.
(Continued)

*Primary Examiner* — Abdelnabi O Musa
(74) *Attorney, Agent, or Firm* — Nicholson De Vos Webster & Elliott LLP (57) ABSTRACT

A method and a wireless device for managing selection of a Wireless Local Area Network "WLAN" are disclosed. The wireless device obtains a first sub-set of WLAN identifiers, which first sub-set relates to user preference for selection of WLAN, and/or a second sub-set of WLANs, which second sub-set relates to WLAN Selection Policy. The wireless device receives, from the radio network node, a third sub-set of WLAN identifiers, which third sub-set relates to a list of WLANs, wherein each of the first and/or second sub-sets and the third sub-set is associated with a respective priority level for indicating which WLAN to prioritize over the other WLANs. The wireless device selects a WLAN from among the first, second and third sub-sets of WLAN identifiers based on the respective priority levels. The wireless device
(Continued)

evaluates RAN rules in view of the selected WLAN, and connects to the selected WLAN when the RAN rules are fulfilled.

20 Claims, 6 Drawing Sheets

(51) Int. Cl.
  *H04B 17/318* (2015.01)
  *H04L 12/26* (2006.01)
  *H04W 76/02* (2009.01)
  *H04W 84/12* (2009.01)

(56) References Cited

U.S. PATENT DOCUMENTS

| | | | | |
|---|---|---|---|---|
| 2014/0023059 A1* | 1/2014 | Gupta | ............... | H04W 36/34 370/338 |
| 2014/0071854 A1* | 3/2014 | Xiang | ............... | H04W 48/16 370/254 |
| 2015/0043560 A1* | 2/2015 | Guo | ............... | H04W 24/10 370/338 |
| 2015/0327153 A1* | 11/2015 | Tervonen | ............... | H04W 48/08 370/235 |
| 2015/0334644 A1* | 11/2015 | Kim | ............... | H04W 48/18 370/329 |
| 2016/0029295 A1* | 1/2016 | Nagasaka | ............... | H04W 48/18 370/237 |
| 2016/0119861 A1* | 4/2016 | Jin | ............... | H04W 48/16 370/338 |

OTHER PUBLICATIONS

"RAN-ANDSF Interworking", 3GPP TSG-RAN WG2 #83bis, Tdoc R2-133440, Oct. 7-11, 2013, 6 pages, Ericsson, Ljubljana, Slovenia.
"Way forward for WLAN/3GPP Radio interworking", Aug. 19-23, 2013, 8 pages, 3GPP TSG-RAN WG2 #83, Tdoc R2-132827, Ericsson, St-Ericsson, Barcelona, Spain.
Ericsson, ANDSF interworking, 3GPP TSG-RAN WG2 #83bis, Ljubljana, Slovenia, Tdoc R2-13xxxx, Oct. 7-11, 2013, 6 pages.
3rd Generation Partnership Project; Technical Specification Group Services and System Aspects; Study on Wirelss Local Area Network (WLAN) network selection for 3GPP terminals; Stage 2 (Release 12), 3GPP TR 23.865 V12.0.0 (Sep. 2013), Technical Report, Sep. 2013, 45 pages.
3rd Generation Partnership Project; Technical Specification Group Services and System Aspects; Architecture enhancements for non-3GPP accesses (Release 12), 3GPP TS 23.402 V12.2.0 (Sep. 2013), Technical Specification, Sep. 2013, 256 pages.
3rd Generation Partnership Project; Technical Specification Group Core Network and Terminals; Access Network Discovery and Selection Function (ANDSF) Management Object (MO) (Release 12), 3GPP TS 24.312 V12.2.0 (Sep. 2013), Technical Specification, Sep. 2013, 174 pages.
Written Opinion of the International Preliminary Examining Authority for Application No. PCT/SE20141051066, dated Aug. 20, 2015, 7 pages.
International Preliminary Report on Patentability for Application No. PCT/SE2014/051066, dated Jan. 18, 2016, 18 pages.

* cited by examiner

METHOD AND WIRELESS DEVICE FOR MANAGING SELECTION OF WLAN IN A CELL OPERATED BY A 3GPP CELLULAR COMMUNICATION SYSTEM

CROSS-REFERENCE TO RELATED APPLICATIONS

This application is a National stage of International Application No. PCT/SE2014/051066, filed Sep. 16, 2014, which claims priority to U.S. Application No. 61/883,225, filed Sep. 27, 2013, which are hereby incorporated by reference.

TECHNICAL FIELD

Embodiments herein relate to wireless communication systems, such as telecommunication systems. In particular, a method and a wireless device for managing selection of a Wireless Local Area Network (WLAN) are disclosed. Additionally, a computer program and a computer program product corresponding thereto are disclosed.

BACKGROUND

Third Generation Partnership Project (3GPP) has defined a functionality called Access Network Discovery and Selection Function (ANDSF) specified in 3GPP Technical Specification (TS) 23.402 and 3GPP TS 24.312. This functionality is based on that the network provides the user equipment (UE) with policy rules for helping the user equipment in performing Wireless Local Area Network (WLAN/Wi-Fi) access selection and traffic steering.

Furthermore, the ANDSF mechanism is enhanced in 3GPP Rel-12 by addition of support for HotSpot (HS) 2.0 parameters as defined by Wi-Fi Alliance. The support for HS2.0 is specified in 3GPP Technical Report (TR) 23.865.

At the same time, there are ongoing enhancements to ANDSF in 3GPP Technical Specification Group (TSG) System Aspects (SA) 2. There is also an ongoing study in 3GPP TSG RAN2 on introducing Radio Access Network (RAN) support for controlling WLAN access selection and traffic steering. A motivation for introducing RAN support for this includes the possibility to make the access selection dependent on radio performance and radio network conditions such as signal strength, cell load etc.

Access Network Discovery and Selection Function

In the following, different components of ANDSF, as described in 3GPP TR 23.865 v12.0.0, are briefly summarized.

WLAN Selection Policy

The WLAN Selection Policies (WLANSPs) provide priorities between different WLANs. WLANSP cannot say anything about 3GPP cellular connections. It has been suggested to introduce Base Station System (BSS) load in the WLANSP polices which could then look like the example below.

With a policy like in the example, the user equipment would connect to WLAN A if in coverage and the load is below 70%, otherwise it would connect to WLAN B, if in coverage.

TABLE 1

WLANSP example.

| | |
|---|---|
| Prio 1. | WLAN A if Base Station System (BSS) load < 70% |
| Prio 2. | WLAN B |

Inter-System Routing Policy

Inter-system routing policies (ISRPs) are used to indicate how the user equipment should route traffic between different accesses. ISRP is only applicable for UEs which are capable of having simultaneous connection to WLAN and 3GPP. The ISRP policies do not tell the UE which access to connect to but only how to route traffic once the UE is connected to the accesses simultaneously.

An example policy is found below. With the example policy the UE would route voice traffic to 3GPP but browsing to WLAN, if connected to both. If the UE is not connected to WLAN then the UE would route both voice and browsing over 3GPP.

ISRP Example.

For Access Point Name (APN) A (e.g. voice):
        Prio 1. 3GPP
        Prio 2. WLAN
    For APN B (e.g. browsing):
        Prio 1. WLAN
        Prio 2. 3GPP RAN Controlled WLAN Offloading In the 3GPP TSG RAN2 study on WLAN access selection, there is currently a proposed compromise solution, in which the user equipment performs access selection according to rules specified in RAN specifications. These rules indicate when the user equipment should go to WLAN and when the user equipment should go to 3GPP. According to the rule, the user equipment compares measured metrics, e.g. 3GPP and WLAN signals strengths, with thresholds signalled from RAN. In this document, these rules may be referred to as "RAN rules relating to WLAN".

Example of RAN Rule for Long Term Evolution (LTE):

```
if (measuredRsrp < threshRsrpLow) AND (measuredRcpi >
threshRcpiHigh) {
    goToWlan( );
} else if (measuredRsrp > threshRsrpHigh) OR (measuredRcpi <
threshRcpiLow) {
    goTo3gpp( );
}
```

When the UE's measured Reference Signal Received Power (RSRP) is below threshRsrpLow and the measured received channel power indicator (RCPI) exceeds threshRcpiHigh, the user equipment would go to WLAN. When the UE's measured RSRP exceeds threshRsrpHigh or the measured RCPI is below threshRcpiLow, the user equipment would go to 3GPP.

The RAN will also indicate which WLANs should be considered by the user equipment when evaluating the RAN rule. This could for example be a list of WLANs provided to the UE. It is also be possible to have different RAN-lists for different sets of thresholds to provide WLAN distinction if seen necessary.

The known solutions for RAN/WLAN integration, or inter-working, gives the possibility for controlling Wi-Fi access selection and traffic steering based on radio performance, load, mobility and other parameters which leads to optimized end user and system performance. A problem is however is that there are scenarios when RAN control is not desired, e.g. when there is some other reasons for Wi-Fi selection which may not be controlled by the RAN.

A first exemplifying scenario relates to when the user equipment is roaming in another country. In this scenario, an operator typically wishes the user equipment to connect only to certain WLAN APs for which there is a special roaming agreement (lower cost). The operator policies for Wi-Fi selection may in this scenario be handled by ANDSF polices of a home operator relating to the user equipment, i.e. the subscription of the user equipment.

A second exemplifying scenario relates to when a user of the user equipment wishes to connect to a private network, over which the operator has no control. The policies for Wi-Fi selection may in this scenario be handled by end user preferences configured in the user equipment.

SUMMARY

An object may be to improve the known solutions for RAN/WLAN integration of the above mentioned kind. For example, increased flexibility concerning which WLAN will be selected may desired.

According to an aspect, the object is achieved by a method, performed by a wireless device, for managing selection of a WLAN. The wireless device is located in a cell operated by a radio network node of a 3GPP cellular communication system. The wireless device obtains a first sub-set of WLAN identifiers, which first sub-set relates to user preference for selection of WLAN, and/or a second sub-set of WLANs, which second sub-set relates to WLAN Selection Policy. The wireless device receives, from the radio network node, a third sub-set of WLAN identifiers, which third sub-set relates to a list of WLANs, wherein each of the first and/or second sub-sets and the third sub-set is associated with a respective priority level for indicating which WLAN to prioritize over the other WLANs of the first and/or second sub-sets and the third sub-set. Furthermore, the wireless device selects a WLAN from among the first, second and third sub-sets of WLAN identifiers based on the respective priority levels. Next, the wireless device evaluates Radio Access Network (RAN) rules in view of the selected WLAN. The RAN rules indicates when the wireless device goes to the selected WLAN and when the wireless device goes to the 3GPP cellular communication system, when the selected WLAN is from the third sub-set. The wireless device connects to the selected WLAN when the RAN rules are fulfilled.

According to another aspect, the object is achieved by a wireless device configured to manage selection of a WLAN. The wireless device is located in a cell operated by a radio network node of a 3GPP cellular communication system. The wireless device is configured to obtain a first sub-set of WLAN identifiers, which first sub-set relates to user preference for selection of WLAN, and/or a second sub-set of WLANs, which second sub-set relates to WLAN Selection Policy. Furthermore, the wireless device is configured to receive, from the radio network node, a third sub-set of WLAN identifiers, which third sub-set relates to a list of WLANs, wherein each of the first and/or second sub-sets and the third sub-set is associated with a respective priority level for indicating which WLAN to prioritize over the other WLANs of the first and/or second sub-sets and the third sub-set. The wireless device is configured to select a WLAN from among the first, second and third sub-sets of WLAN identifiers based on the respective priority levels. Moreover, the wireless device is configured to evaluate RAN rules in view of the selected WLAN, when the selected WLAN is from the third sub-set. The RAN rules indicates when the wireless device goes to the selected WLAN and when the wireless device goes to the 3GPP cellular communication system. Additionally, the wireless device is configured to connect to the selected WLAN when the RAN rules are fulfilled.

As an example, there may herein be provided a method, performed by a wireless device, for WLAN access selection and/or service mapping based on RAN and/or ANDSF/User level information. Accordingly, it is herein proposed how 3GPP/WLAN inter-working may be further improved.

Hence, the embodiments herein solve the problem of allowing 3GPP RAN control over WLAN access selection and/or traffic steering while still maintaining compatibility with existing principles for ANDSF or user level policies/decisions for access and traffic selection.

Advantages of some embodiments herein include a possibility to control WLAN access selection and traffic steering in the RAN, without requiring changes to ANDSF or user mechanism for WLAN access selection. An operator may for instance use ANDSF steering for "legacy" UEs and use RAN steering for "new" UEs, possibly only in some areas. In this case the WLAN APs, and the priority order, may be same for ANDSF and RAN steering, but for the wireless device that supports RAN steering, the ANDSF policies will be ignored. WLAN AP list(s) provided from the RAN can be changed in a dynamic way when needed.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

In order to better appreciate the benefits and advantages of the embodiments herein, problems with existing solutions will be analyzed here.

It has been realized that a problem for a wireless device is to know when to follow RAN control, when to use ANDSF and when to apply user preferences, during access selection.

Another problem is how the wireless device may prioritize WLAN APs in case multiple WLAN APs are found. These multiple WLAN Aps may be controlled either by ANDSF or RAN.

The embodiments herein solve the problems with the existing solution using multiple mechanisms.

A first mechanism relates to that a priority order in which the wireless device consider different WLANs is separated from the actual control of the access selection and/or traffic steering.

This simplifies the problem since the priority order can be rather independent from if the WLANs are RAN controlled or not.

The priority order may for instance be User=>Home operator ANDSF=>Visited operator ANDSF=>WLAN APs provided by RAN, but also other priority orders can be supported.

A second mechanism relates to that once a WLAN AP has been selected, the wireless device will check if this WLAN is RAN controlled or not, based on information provided by the RAN as well as other pre-defined criteria.

If the WLAN is RAN controlled the UE will act according to RAN access selection principles and ignore ANDSF policies etc. for access selection.

If the WLAN is not RAN controlled it will follow ANDSF policies if present. This may mean that if the WLAN is included in an ANDSF policy, the UE will act according to the ANSDF policy for that WLAN and ignore RAN rules for that WLAN.

Notably, this makes it possible to avoid impacts on ANDSF/user mechanism for access selection which can be kept as today. All impacts are on RAN level.

Furthermore, it shall be noted that other pre-defined criteria may include cases where RAN controlled access selection is forbidden when wireless device is roaming in another network.

According to some embodiments herein, it is also possible for the RAN to only control the WLAN access selection if desired and allow ANDSF to control the traffic steering, or service mapping, once a WLAN has been selected.

Throughout the following description similar reference numerals have been used to denote similar features, such as elements, units, modules, circuits, nodes, parts, items or the like, when applicable. In the Figures, features that appear in some embodiments are indicated by dashed lines.

Figure 1:
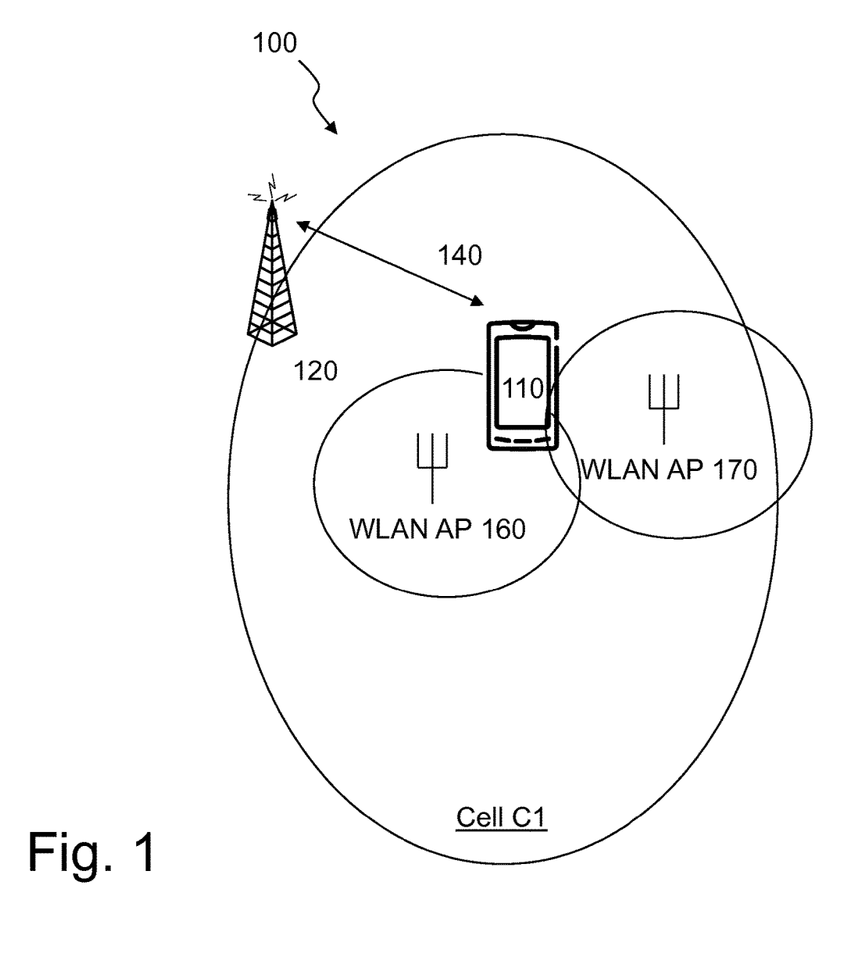
FIG. 1 is a schematic overview of an exemplifying radio communications system in which embodiments herein may be implemented.

FIG. 1 depicts an exemplifying radio communications system 100 in which embodiments herein may be implemented. In this example, the radio communications system 100 is a Long Term Evolution (LTE) system. In other examples, the radio communication system may be any 3GPP cellular communication system, such as a Wideband Code Division Multiple Access (WCDMA) network, a Global System for Mobile communication (GSM network) or the like.

The radio communication system 100 comprises a radio network node 120. As used herein, the term "radio network node" may refer to an evolved Node B (eNB), a control node controlling one or more Remote Radio Units (RRUs), a radio base station, a base station, an access point or the like. In this document, the radio network node 130 represents a portion of a radio access network (RAN).

The radio network node 130 may operate a cell C1.

Furthermore, a wireless device 110, aka a user equipment, is located in the cell C1. The wireless device 110 may communicate 140, e.g. via a radio interface, with the radio network node 120.

Moreover, there may be one or more WLAN Access Points, shown as WLAN AP 160 and WLAN AP 170, such as a first and a second WLAN access point, respectively. Each WLAN access point may be identified by a respective WLAN APN, or other identifier. The wireless device 110 may be located in the vicinity of one or both of said first and second WLAN access points. As used herein, the terms "WLAN" and "Wi-Fi" may be used interchangeably.

As used herein, the term "wireless device" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. It may here also be noted that the term "user" may refer to the wireless device.

According to one exemplifying embodiment, the wireless device may obtain a list of WLANs which the wireless device may consider for connection. The wireless device may set a respective priority for each of the WLANs of the list. Thereafter, the wireless device may select a WLAN for which the respective priority is the highest (i.e. the most prioritized, alternatively the most prioritized may be indicated be a lowest value) among the respective priorities for each of the WLANs of the list. In this manner, the wireless device may select a WLAN based the respective priorities. When the selected WLAN, e.g. the WLAN AP, is received from a radio network node, e.g. RAN provided the WLAN AP, the wireless device may check whether RAN steering/control for the selected WLAN is allowed e.g. by checking a black list comprising non-allowed WLANs (i.e. RAN steering is not allowed for the WLANs in the black list). As an example, the black list may be configured by the user of the wireless device or provided by the home operator. When RAN steering is allowed, the wireless device may apply RAN rules relating to WLAN. If conditions according to RAN rules relating to WLAN are fulfilled, the wireless device may connect to the WLAN. In cases when the selected WLAN is not received from the radio network node (e.g. is in the RAN-list according the detailed description), the wireless device may connect to the selected WLAN.

Figure 2:
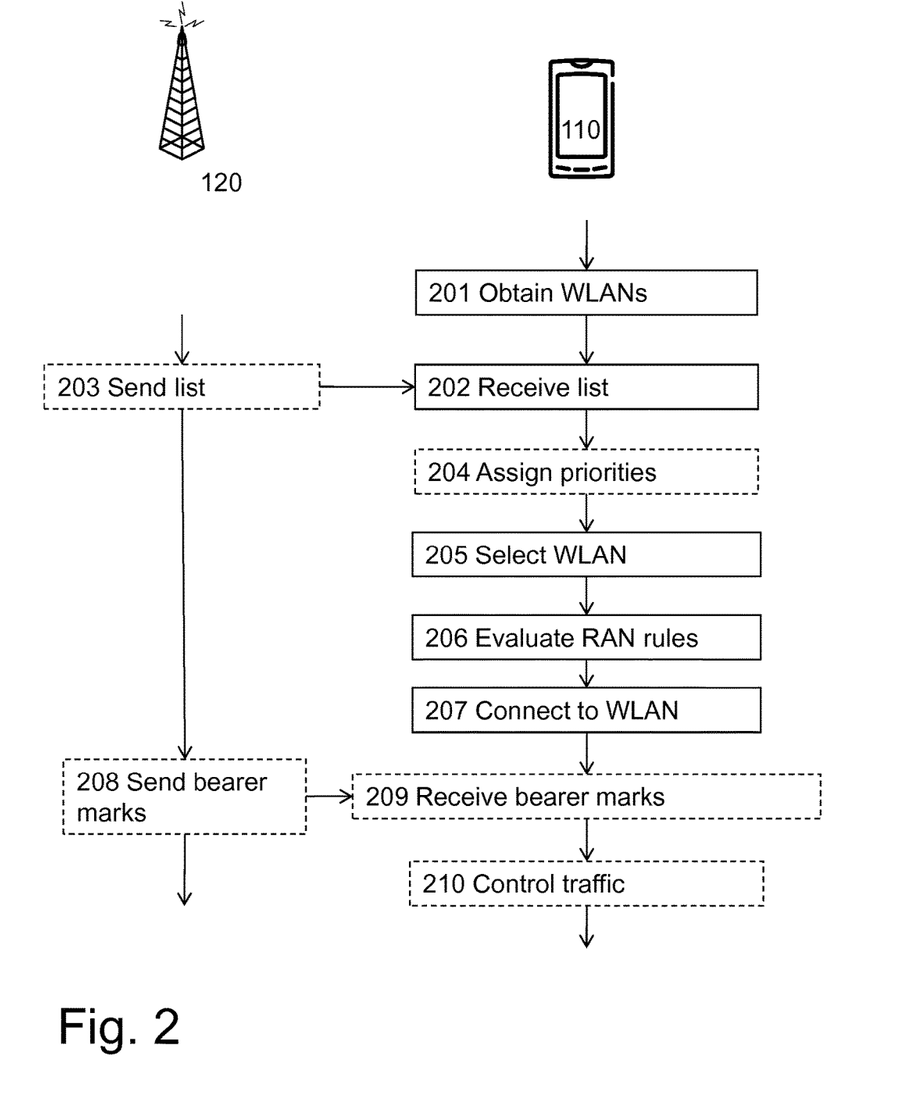
FIG. 2 is a schematic, combined signaling scheme and flowchart illustrating embodiments of the methods when performed in the radio communication system according to FIG. 1.

FIG. 2 illustrates an exemplifying method for managing selection of a WLAN when implemented in the radio communication system 100 of FIG. 1. The wireless device performs a method for managing selection of a WLAN, such as the first and second WLAN access points. As mentioned, the wireless device 110 is located in the cell C1, operated by the radio network node 120 of the 3GPP cellular communication system 100. As an example, the selection of a WLAN may be a selection of one of the first and second WLANs, or WLAN access points. The selection of one of the first and second WLANs may mean that the wireless device 110 may connect to one of the first and second WLAN access points after application of (or applying) on one or more of ANDSF, user preferences or RAN rules as described herein.

The following actions may be performed in any suitable order. Some actions may be omitted as indicated by the wording "may".

Action 201

The wireless device 110 obtains a first sub-set of WLAN identifiers, which first sub-set relates to user preference for selection of WLAN, and/or a second sub-set of WLANs, which second sub-set relates to WLAN Selection Policy.

Generally, this means that the wireless device 110 may obtain a set of WLANs, or APs. The set of WLANs is to be considered by the wireless device when selecting which WLAN to connect to, for example if possible/allowed depending on e.g. radio conditions and/or if RAN steering is allowed.

The set of WLANs may be obtained in many different ways. Typically, the set of WLANs may comprise subsets of WLANs (or WLAN APs).

In the following, it is further described which WLANs to consider, i.e. those WLANs that the wireless device 110 is aware of.

When doing access selection the wireless device 110 will consider the set of WLANs. The set may comprise WLANs (or sub-sets thereof) acquired (or obtained) by the wireless device 110 in different ways.

Consider the following examples.

A first sub-set relating to user preference. User preference—The user may have provided to the wireless device 110 a set of WLANs which may be considered when doing access selection. This could for example be done by the user manually indicating which WLANs may be considered by the wireless device 110 when doing access selection.

A second sub-set relating to WLANSP. WLANSP—In ANDSF the terminal can receive a WLAN selection policy (WLANSP) containing WLANs which may be considered by the wireless device 110. The WLANSP can contain priorities between the indicated WLANs A third sub-set relating to a list received from RAN. RAN-list—the wireless device 110 may receive from the RAN a list of WLANs which shall be considered by the wireless device 110 when evaluating RAN rules.

Each sub-set comprises one or more indications relating to a respective WLAN, or WLAN AP.

In some examples, the set of WLAN comprises the third sub-set relating to the list received from the radio access network, such as the radio network node.

Each WLAN of the sets may be associated with a respective priority for indicating which WLAN to prioritize over the other WLANs of the sets. Prioritize may here mean which WLAN the wireless device may first attempt to connect to/with.

It should be appreciated that these are just examples inputs of which WLANs the wireless device 110 may considered. Other possibilities are also possible, e.g. the wireless device 110 may be preconfigured to consider some WLANs, it may be provided to the wireless device 110 via the SIM etc. Further, such preconfigured WLANs may be provided by core network nodes handling subscription information, such as Home Subscriber System or the like.

In one example the wireless device 110 considers the following WLANs:

TABLE 3

Example of considered WLAN.

| Source | WLAN |
|---|---|
| User preference | WLAN A |
|  | WLAN B |
| WLANSP | WLAN C - Priority 1 |
|  | WLAN D - Priority 2 |
| RAN-list | WLAN D |
|  | WLAN E |

It is possible that there are different sources which provide the same WLANs as is shown in the above example where WLANSP and RAN-list both indicates that WLAN D may be considered.

The wireless device 110 may also be provided with multiple RAN-lists where the WLAN on some lists has higher priority than the WLAN provided in the WLANSP while other lists have lower priority, e.g. than the WLAN in the WLANSP. The list can have zero or more elements, where zero indicates that no WLAN are provided in that list. Accordingly, the wireless device 110 may be provided with multiple third sub-sets, wherein the WLAN of some third sub-set has a respective priority level that is higher than a WLAN of the second sub-set, while other WLAN of some other third sub-set has a respective priority level that is lower than the WLAN of the second sub-set.

Similarly, the wireless device 110 may be provided with multiple WLANSP lists from different sources e.g. from home operator or from visited operator in case of roaming.

Action 203

The radio network node 120 may send, to the wireless device 110, a list relating to WLANs, or the second sub-set of WLANs or the RAN-list of WLANs, which may be considered (with regard to connecting thereto) by the wireless device. As an example, the list may be a list of WLAN APs to which the wireless device 110 may connect depending on priority, radio conditions, etc.

Action 202

The wireless device 110 may receive the list described in action 203. In particular, the wireless device 110 receives, from the radio network node 120, the third sub-set of WLAN identifiers, which third sub-set relates to a list of WLANs. As mentioned, each of the first and/or second sub-sets and the third sub-set is associated with a respective priority level for indicating which WLAN to prioritize over the other WLANs of the first and/or second sub-sets and the third sub-set.

In some examples, a further prioritization between the WLANs within a specific sub-set may be performed. In these examples, the respective priority level may comprise an associated priority between WLANs within the specific sub-set, e.g. within at least one of the first, second and third sub-sets. This means that the respective priority level may comprise a range of associated priorities, e.g. priority values. Each priority value may be associated to a respective WLAN within the specific sub-set.

Action 203

To simplify understanding of this combined signalling and flowchart, it shall here be said that action 203 is performed before action 202 is performed.

Accordingly, in order to make the wireless device 110 aware of the third sub-set, the radio network node 120 may send the third sub-set to the wireless device 110.

Action 204

The wireless device 110 may assign priorities to each of the WLANs of the set. As an example, the wireless device 110 may assign a respective priority level (or priority value) to each of the WLANs in the set. However, in some examples, the priority levels for the respective WLANs of the set may be predetermined (or predefined). For example, the list received in action 202 may include a respective priority level for each respective WLAN of the list.

Prioritization of Different WLANs

The wireless device 110 may assign priorities to the considered WLANs. According to some embodiments, it is foreseen different ways of how the priorities may be assigned. For example, the wireless device 110 may follow a preconfigured rule when assigning priorities between the WLANs, the network may indicate to the wireless device 110 (e.g. the wireless device) how the wireless device 110 should assign the priorities, etc.

It can be foreseen many different ways of assigning priorities between the WLANs. For example, the wireless device 110 may give highest priority to WLANs provided by user preference, e.g. home WLANs. The wireless device 110 would give second highest priority to WLANs which are provided by WLANSP, and third highest priority to WLANs which are provided by the RAN.

Note that the different sources from which the wireless device 110 receives WLANs may also provide an associated priority between the different provided WLANs. For example, WLANSP not only indicated which WLANs may be considered, it can also provide priorities between the indicated WLANs, as indicated in the list below. Similarly the end user preference may be to consider multiple WLANs and the end user may also have different priorities for different WLANs, for example, the wireless device 110 may prioritize WLAN A over WLAN B which could mean that when the wireless device 110 is in the coverage of both WLAN A and WLAN B the wireless device 110 may connect to WLAN A. It should be noted that this is a simple example and it may be so that the wireless device 110 will do a more intelligent selected between WLAN A and WLAN B when in coverage of both such as considering the signal strengths of the two WLANs.

When the wireless device 110 has assigned priorities to the considered WLANs the wireless device 110 could have a priority order of considered WLAN looking like the following example:
Prio 1. WLAN A
Prio 2. WLAN B
Prio 3. WLAN C
Prio 4. WLAN D
Prio 5. WLAN E Action 205

The wireless device 110 selects a WLAN from among the first, second and third sub-sets of WLAN identifiers based on the respective priority levels.

The selection of the selected WLAN may be performed while WLANs from the first sub-set takes precedence before WLANs of the second and third sub-sets.

The selection of the selected WLAN may be performed while WLANs from the second sub-set takes precedence before WLANs of the third sub-set.

The wireless device may select a WLAN to connect to in a subsequent action.

As an example, the selection may be based on the priorities determined in action 204. Further examples are given below.

WLAN Selection

The wireless device 110 may select, not yet connect to, a WLAN which is in the set of considered WLANs. The wireless device 110 could select WLAN according to priority order. It should be noted that other alternatives for selecting WLANs are also possible, for example, select a random WLAN, select the WLAN from which the strongest received signal strength is received, etc. In case, the WLANs priority order (levels) are set based on e.g. received signal strength, it means that the priority levels are dynamically determined. Accordingly, the priorities may need to be updated e.g. periodically or upon detection of mobility of the wireless device, i.e. if the wireless device has moved, or is moving. However, as example the alternative when the wireless device 110 selects WLANs according to priority order is described below.

The wireless device 110 may only select a WLAN, out of the considered WLANs, which the wireless device 110 is in coverage of. In the example priority order described above, if the wireless device 110 is in coverage of WLAN B, WLAN D and WLAN E, and give that the wireless device 110 is selecting the WLAN B which has highest priority among the WLANs which the wireless device 110 is in coverage of. Being in coverage of a WLAN could be defined as the wireless device 110 has detected that WLAN, it could be defined as the received signal strength from that WLAN is above a threshold, etc.

Action 206

The wireless device 110 evaluates RAN rules in view of the selected WLAN when the selected WLAN is from the third sub-set. The RAN rules indicate when the wireless device 110 goes to, e.g. connects to, the selected WLAN and when the wireless device 110 goes to, e.g. connects to, the 3GPP cellular communication system 100.

The RAN rules may comprise access selection and/or traffic steering rules.

In more detail, the evaluation of the RAN rules may comprise:
1) when the wireless device's 110 measured signal strength of the 3GPP cellular communication system 100 is below a first threshold and the wireless device's 110 measured signal strength of WLAN exceeds a second threshold, going to the selected WLAN; and
2) when the wireless device's 110 measured signal strength of the 3GPP cellular communication system 100 exceeds a third threshold or the wireless device's 110 measured signal strength of WLAN is below a fourth threshold, going to the 3GPP cellular communication system 100.

The signal strength of RAN may be Reference Signal Received Power (RSRP) or Received signal code power (RSCP) and signal strength of WLAN may be received channel power indicator (RCPI) or received signal strength indicator (RSSI).

Action 207

The wireless device 110 connects to the selected WLAN when the RAN rules are fulfilled.

Expressed differently, the wireless device may connect to the selected WLAN based on whether the selected WLAN is the RAN-list and whether RAN steering is allowed for the selected WLAN.

In case RAN steering is not allowed for the selected WLAN, the wireless device 110 may not apply the RAN control procedure as below.

As an example, the wireless device may check a black list comprising WLANs for which RAN steering is not allowed. As an example, the black list may be configured by the user or provided by the home operator.

As another example, when the wireless device 110 has selected a WLAN the wireless device 110 would evaluate whether or not the selected WLAN is under RAN control, e.g. if the selected WLAN is indicated by RAN. If the selected WLAN is under RAN control the wireless device 110 would apply the RAN control procedure for this WLAN. The RAN control procedure would dictate whether or not the wireless device 110 should connect to the WLAN. Explained in the background section, a possible RAN control procedure, e.g. according to the RAN rules relating to WLANs, is that the wireless device 110 compares the received signal level for the WLAN and if this signal level exceeds a threshold the wireless device 110 would connect to WLAN, otherwise the wireless device 110 would not connect to that WLAN.

If according to the RAN control procedure the wireless device 110 should not connect to the selected WLAN the wireless device 110 would select another WLAN according to priority order.

If the selected WLAN is not under RAN control the wireless device 110 would not apply the RAN control procedure. The wireless device 110 may apply another procedure to evaluate whether or not to connect to the selected WLAN, for example if the selected WLAN is indicated in the WLANSP there may be conditions in WLANSP indicating whether or not to connect to that WLAN.

In case, the wireless device fails to connect to the selected WLAN, e.g. due to failure during application of the RAN rules relating to WLANs, ANDSF application or user preference, the wireless device may select the secondly most prioritized WLAN among the set of WLANs as indicated by the respective priority level. Next, the wireless device may repeat this action and proceed onwards when successfully connected to the selected WLAN.

Action 208

At this stage, the wireless device 110 may have connected to the selected WLAN.

Hence, the radio network node 120 may send bearer marks, or bearer markings, to the wireless device 110 in order to control or steer traffic between WLANs and cellular networks.

Action 209

The wireless device 110 may receive, from the radio network node 120, bearer markings, or bearer marks, such as values relating to difference bearers. This may mean that the wireless device may receive one or more indications (marks) relating to a respective bearer. The respective bearer may be identified by Guaranteed Bit Rate (GBR) requirements, Quality of Service, type of bearer, voice traffic, data traffic etc. Different traffic flows may be mapped to different bearers Alternatively or additionally, the wireless device may obtain bearer markings from a core network node, such as the network node 120. These bearer markings may be provided by an operator.

Action 210

The wireless device may control traffic, e.g. which bearers be carried over the WLAN or which bearers to be carried over the RAN.

Traffic Steering or Traffic Control

The procedure of connecting to the WLAN and steering traffic to the WLAN are two separate actions. According to some embodiments, the UE will apply different procedures for traffic steering depending on whether or not the WLAN which the UE connected to is under RAN-control or not.

If the WLAN is under RAN control the UE would apply traffic steering information provided by RAN. One possibility is that RAN provides traffic steering information to the UE which indicates which traffic should be steered to WLAN. If no such information is available to the UE the UE may perform traffic steering according to some other procedure, e.g. apply an ISRP rule or steer traffic according to a preconfigured rule, etc.

If the WLAN is not under RAN control the UE does not apply traffic steering information provided by RAN. The UE may steer traffic steering according, for example, ISRP.

Figure 3:
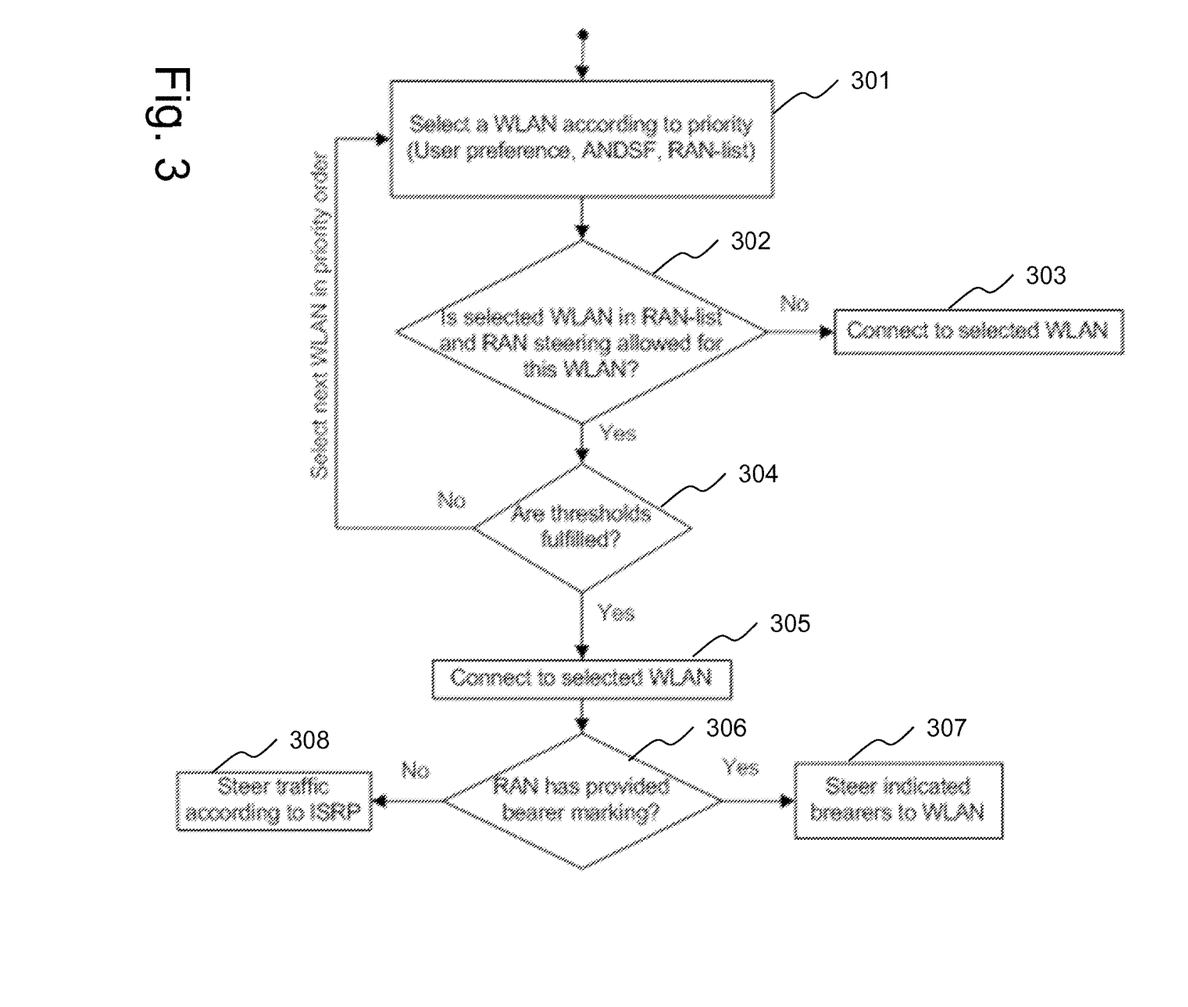
FIG. 3 is a schematic flowchart illustrating embodiments herein.

With reference to FIG. 3, first the wireless device 110 selects a WLAN out of the WLANs which has been detected, i.e. not yet connecting to the WLAN.

Action 301

The wireless device 110 selects WLAN in order of priority.

Action 302

The wireless device 110 would then see, e.g. may check, if the selected WLAN is "RAN-controlled", i.e. if the WLAN is in the RAN-list.

Action 303

For the roaming scenario/case, the wireless device 110 may have been provided with a WLANSP from the home PLMN designed such that the wireless device 110 would connect to a WLAN X belonging to a partner of the home operator.

However, if the visited RAN has WLAN X in the RAN-list it would mean that the roaming wireless device 110 would only connect to WLAN X when the RAN-rules indicates so, which may not be wanted by the home operator. Therefore it could be considered to add a flag in WLANSP indicating that any RAN-rules should be ignored for this particular WLAN.

Action 304

If this is the case the wireless device 110 would proceed to evaluate the RAN rules. However, if the selected WLAN is not RAN controlled, e.g. if it is an end-user preferred WLAN, the UE would connect to the selected WLAN as in action 303 above.

For RAN-controlled WLANs the wireless device 110 would evaluate the RAN-rules to see if the thresholds for moving to WLAN are met.

Action 305

If so, the wireless device 110 connects to the selected WLAN. If the thresholds are not met, the wireless device 110 would start over and select another WLAN according to the WLAN priority order.

Action 306

When the wireless device 110 has connected to a RAN controlled WLAN, the wireless device 110 does traffic steering.

Action 307

If the RAN has provided traffic indicators to the wireless device 110, the wireless device 110 would steer the traffic accordingly.

Action 308

Otherwise, with respect to action 307, the wireless device 110 would apply ISRP rules.

Based on the examples above, the wireless device 110 has the following WLANs and priorities.

| Priority | WLAN | In RAN-list |
|---|---|---|
| 1 | WLAN A | No |
| 2 | WLAN B | No |
| 3 | WLAN C | No |
| 4 | WLAN D | Yes |
| 5 | WLAN E | Yes |

Two different scenarios are described with reference to FIGS. 4 and 5.

Figure 4:
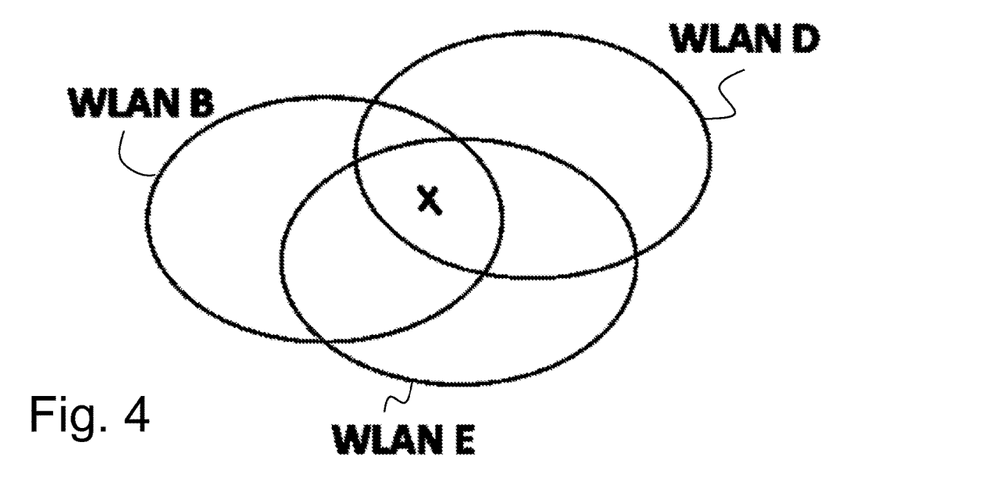
FIGS. 4 and 5 are exemplifying scenarios, illustrating embodiments herein.

Referring to FIG. 4, the wireless device (indicated by an X) is in coverage of WLAN B, WLAN D and WLAN E. This means that the wireless device would have the following WLAN priority list:

| Priority | WLAN | In RAN-list |
|---|---|---|
| 1 | WLAN A | No |
| 2 | WLAN B | No |
| ~~3~~ | ~~WLAN C~~ | ~~No~~ |
| 4 | WLAN D | Yes |
| 5 | WLAN E | Yes |

The wireless device would select the highest priority WLAN, i.e. WLAN B. Since this WLAN is not in the RAN-list the wireless device would then connect to WLAN B.

Figure 5:
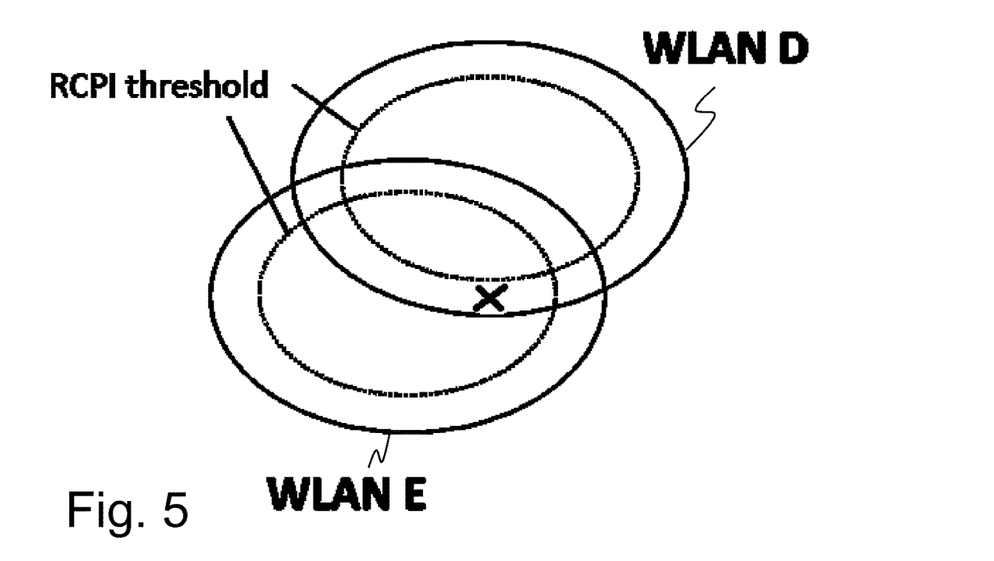

Referring to FIG. 5, the wireless device (indicated by an X in the Figure) is in coverage of WLAN D and WLAN E. Note that the wireless device is in a location where the RCPI threshold for connecting to WLAN D is not fulfilled.

| Priority | WLAN | In RAN-list |
|---|---|---|
| ~~1~~ | ~~WLAN A~~ | ~~No~~ |
| ~~2~~ | ~~WLAN B~~ | ~~No~~ |
| ~~3~~ | ~~WLAN C~~ | ~~No~~ |
| 4 | WLAN D | Yes |
| 5 | WLAN E | Yes |

The wireless device would first select WLAN D as this has the highest priority. As WLAN D is in the RAN-list the wireless device would evaluate if the thresholds are fulfilled for entering WLAN D, but since this is not the case the wireless device would select the next WLAN in the priority order, i.e. WLAN E. The wireless device would evaluate if the thresholds are fulfilled for entering WLAN E. As the thresholds are fulfilled wireless device would connect to WLAN E.

When the wireless device has connected to WLAN E the wireless device would steer the traffic indicated by the RAN, if such indications has been received. Otherwise the wireless device would apply ISRP.

Figure 6:
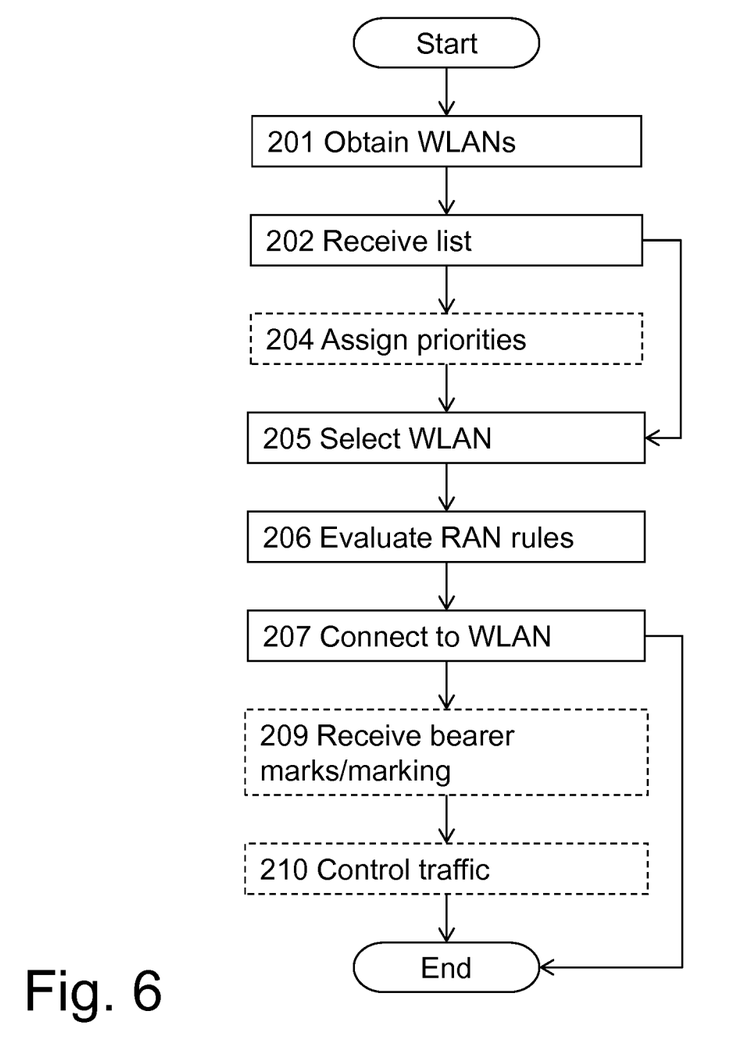
FIG. 6 is a flowchart illustrating embodiments of the method in the wireless device.

In FIG. 6, an exemplifying, schematic flowchart of the method in the wireless device 110 is shown. The wireless device 110 performs a method for managing selection of a Wireless Local Area Network "WLAN". The same reference numerals as in FIG. 2 have been used to denote the same or similar actions.

As mentioned, the wireless device 110 is located in a cell C1 operated by a radio network node 120 of a 3GPP cellular communication system 100.

The following actions may be performed in any suitable order. Some actions may be omitted as indicated by the wording "may".

Action 201

The wireless device 110 obtains a first sub-set of WLAN identifiers, which first sub-set relates to user preference for selection of WLAN, and/or a second sub-set of WLANs, which second sub-set relates to WLAN Selection Policy.

Action 202

The wireless device 110 receives, from the radio network node 120, a third sub-set of WLAN identifiers, which third sub-set relates to a list of WLANs, wherein each of the first and/or second sub-sets and the third sub-set is associated with a respective priority level for indicating which WLAN to prioritize over the other WLANs of the first and/or second sub-sets and the third sub-set.

The wireless device 110 may be provided with multiple third sub-sets, wherein the WLAN of some third sub-set has a respective priority level that is higher than a WLAN of the second sub-set, while other WLAN of some other third sub-set has a respective priority level that is lower than the WLAN of the second sub-set.

The respective priority level may comprise an associated priority between WLANs within at least one of the first, second and third sub-sets.

Action 204

The wireless device 110 may assign priorities to each of the WLANs of the set. As an example, the wireless device 110 may assign a respective priority level (or priority value) to each of the WLANs in the set. However, in some examples, the priority levels for the respective WLANs of the set may be predetermined (or predefined). For example, the list received in action 202 may include a respective priority level for each respective WLAN of the list.

See also action 204 above in connection with FIG. 2.

Action 205

The wireless device 110 selects a WLAN from among the first, second and third sub-sets of WLAN identifiers based on the respective priority levels.

The selection of the selected WLAN may be performed while WLANs from the first sub-set takes precedence before WLANs of the second and third sub-sets.

The selection of the selected WLAN may be performed while WLANs from the second sub-set takes precedence before WLANs of the third sub-set.

Action 206

The wireless device 110 evaluates RAN rules in view of the selected WLAN. The RAN rules indicates when the wireless device 110 goes to the selected WLAN and when the wireless device 110 goes to the 3GPP cellular communication system 100, when the selected WLAN is from the third sub-set.

The RAN rules may comprise access selection and/or traffic steering rules.

The evaluation 206 of the RAN rules may comprise:

when the wireless device's 110 measured signal strength of the 3GPP cellular communication system 100 is below a first threshold and the wireless device's 110 measured signal strength of WLAN exceeds a second threshold, going to the selected WLAN; and when the wireless device's 110 measured signal strength of the 3GPP cellular communication system 100 exceeds a third threshold or the wireless device's 110 measured signal strength of WLAN is below a fourth threshold, going to the 3GPP cellular communication system 100.

The signal strength of RAN may be Reference Signal Received Power (RSRP) or Received signal code power (RSCP) and signal strength of WLAN may be received channel power indicator (RCPI) or received signal strength indicator (RSSI).

Action 207

The wireless device 110 connects to the selected WLAN when the RAN rules are fulfilled.

Action 209

See also action 209 in connection with FIG. 2.

Action 210

The wireless device may control traffic, e.g. which bearers be carried over the WLAN or which bearers to be carried over the RAN. See also action 210 above in connection with FIG. 2.

Figure 7:
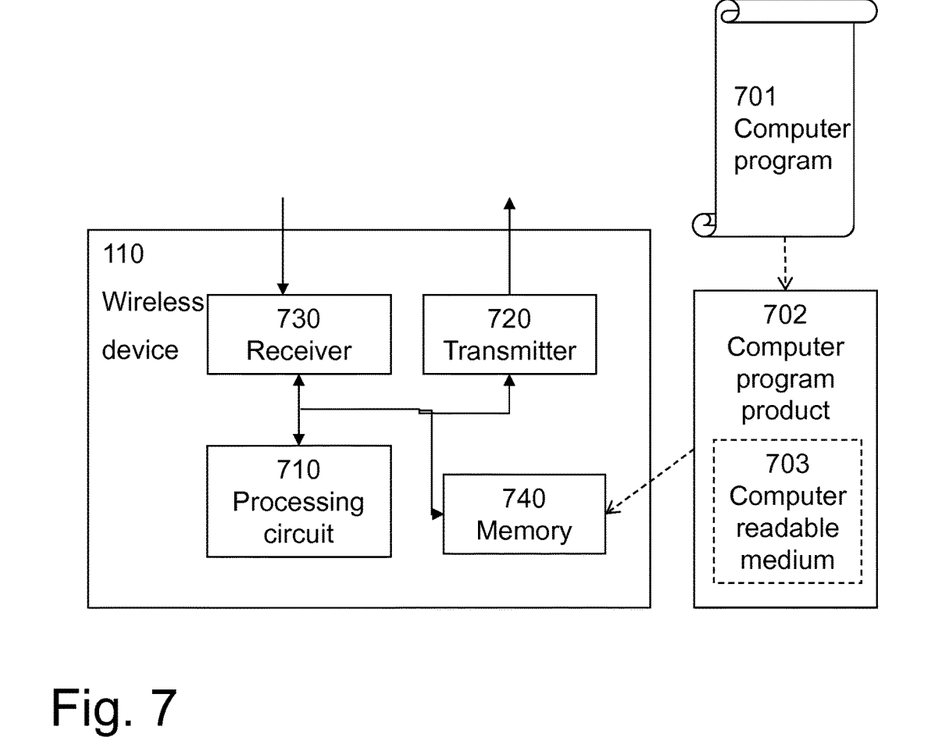
FIG. 7 is a block diagram illustrating embodiments of the wireless device.

With reference to FIG. 7, a schematic block diagram of the wireless device 110 is shown. The wireless device 110 is configured to perform the methods in FIGS. 2, 3 and/or 6. In more detail, the wireless device 110 is configured to manage selection of a Wireless Local Area Network "WLAN". As mentioned, the wireless device 110 may be located in a cell C1 operated by a radio network node 120 of a 3GPP cellular communication system 100.

The wireless device 110 comprises a processing circuit 710.

The wireless device 110 and/or the processing circuit 710 is configured to obtain a first sub-set of WLAN identifiers, which first sub-set relates to user preference for selection of WLAN, and/or a second sub-set of WLANs, which second sub-set relates to WLAN Selection Policy.

The wireless device 110 and/or the processing circuit 710 is configured to receive, from the radio network node 120, a third sub-set of WLAN identifiers, which third sub-set relates to a list of WLANs, wherein each of the first and/or second sub-sets and the third sub-set is associated with a respective priority level for indicating which WLAN to prioritize over the other WLANs of the first and/or second sub-sets and the third sub-set.

The wireless device 110 may be configured to be provided with multiple third sub-sets, wherein the WLAN of some third sub-set has a respective priority level that is higher than a WLAN of the second sub-set, while other WLAN of some other third sub-set has a respective priority level that is lower than the WLAN of the second sub-set.

The respective priority level may comprise an associated priority between WLANs within at least one of the first, second and third sub-sets.

The wireless device 110 and/or the processing circuit 710 is configured to select a WLAN from among the first, second and third sub-sets of WLAN identifiers based on the respective priority levels.

The wireless device 110 and/or the processing circuit 710 may be configured to select the selected WLAN while WLANs from the first sub-set takes precedence before WLANs of the second and third sub-sets.

The wireless device 110 and/or the processing circuit 710 may be configured to select the selected WLAN while WLANs from the second sub-set takes precedence before WLANs of the third sub-set.

The wireless device 110 and/or the processing circuit 710 is configured to evaluate RAN rules in view of the selected WLAN, when the selected WLAN is from the third sub-set. The RAN rules indicates when the wireless device 110 goes to the selected WLAN and when the wireless device 110 goes to the 3GPP cellular communication system 100.

The RAN rules may comprise access selection and/or traffic steering rules.

The wireless device 110 and/or the processing circuit 710 is configured to connect to the selected WLAN when the RAN rules are fulfilled.

The wireless device 110 and/or the processing circuit 710 may be configured to go to the selected WLAN, when the wireless device's 110 measured signal strength of the 3GPP cellular communication system 100 is below a first threshold and the wireless device's 110 measured signal strength of WLAN exceeds a second threshold.

The wireless device 110 and/or the processing circuit 710 may be configured to go to the 3GPP cellular communication system 100, when the wireless device's 110 measured signal strength of the 3GPP cellular communication system 100 exceeds a third threshold or the wireless device's 110 measured signal strength of WLAN is below a fourth threshold.

The signal strength of RAN may be Reference Signal Received Power (RSRP) or Received signal code power (RSCP) and signal strength of WLAN may be received channel power indicator (RCPI) or received signal strength indicator (RSSI).

The processing circuit 710 may be a processing unit, a processor, an application specific integrated circuit (ASIC), a field-programmable gate array (FPGA) or the like. As an example, a processor, an ASIC, an FPGA or the like may comprise one or more processor kernels, or processor cores.

As used herein, the term "processing circuit" may be a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software or hardware module. Any such module may be a determining means, estimating means, capturing means, associating means, comparing means, connecting means, identification means, selecting means, checking means, controlling means, receiving means, transmitting means or the like as disclosed herein. As an example, the expression "means" may be a unit, such as a determining unit, selecting unit, etc.

As used herein, the expression "configured to" may mean that a processing circuit is configured to, or adapted to, by means of software or hardware configuration, perform one or more of the actions described herein.

The wireless device 110 further comprises a transmitter 720, which may be configured to send one or more of the information about mobility pattern, checkpoints and other numbers, values or parameters described herein.

The wireless device 110 further comprises a receiver 730, which may be configured to receive one or more of the information about mobility pattern, checkpoints and other numbers, values or parameters described herein.

The wireless device 110 further comprises a memory 740 for storing software to be executed by, for example, the processing circuit. The software may comprise instructions to enable the processing circuit to perform the methods described herein. The memory may be a hard disk, a magnetic storage medium, a portable computer diskette or disc, flash memory, random access memory (RAM) or the like. Furthermore, the memory may be an internal register memory of a processor.

A computer program 701 for managing selection of a WLAN may be provided. The computer program 701 comprises computer readable code units which when executed on a computer, e.g. in the form of the wireless device, causes the computer to perform the method according to FIGS. 2, 3 and/or 6.

A computer program product 702, comprising computer readable medium 703 and a computer program 701 as directly above is provided.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

Even though embodiments of the various aspects have been described, many different alterations, modifications and the like thereof will become apparent for those skilled in the art. The described embodiments are therefore not intended to limit the scope of the present disclosure.

APPENDIX

The following detailed description provides further exemplifying embodiments.

INTRODUCTION

In the previous RAN2 meeting a compromise solution 2 for access selection for the WLAN/3GPP Radio interworking study item was discussed. In this contribution, we describe the interworking between this solution and ANDSF.

ANDSF Overview

See background section above.
ISMP

TABLE 1

ISMP example.

Prio 1. WLAN
Prio 2. 3GPP

Inter-system Mobility policies (ISMPs) are access selection policies used only by UEs which cannot have simultaneous connections to WLAN and 3GPP. Multiple connection-capable UEs ignore ISMP. The ISMP policies provide priority orders between accesses.

Example policy is shown in Table 1. According to this example policy, the UE should select WLAN when in coverage otherwise the UE should connect to any WLAN. If no WLAN is found, the UE stays connected to 3GPP.
WLANSP

TABLE 2

WLANSP example.

Prio 1. WLAN A
if BSS load < 70%
Prio 2. WLAN B

The WLAN selection policies (WLANSPs) provide priorities between different WLANs. WLANSP does not include priorities regarding 3GPP. It has been suggested to introduce BSS load in the WLANSP polices which could then look like the example in Table 2.

With a policy like in the example, a UE inside the coverage area of WLANs A and B will connect to WLAN A if the load of WLAN A is below 70%, otherwise it will connect to WLAN B.
ISRP

TABLE 3

ISRP example.

For APN A (e.g. voice):
    Prio 1. 3GPP
    Prio 2. WLAN
For APN B (e.g. browsing):
    Prio 1. WLAN
    Prio 2. 3GPP Inter-system routing policies (ISRPs) are used to indicate how the UE should route traffic between different access networks. ISRP is only applicable for UEs which are capable of having simultaneous connection to WLAN and 3GPP. The ISRP policies do not tell the UE which access to connect to but only how to route traffic once the UE has got connection to the different access networks.

An example policy is shown in Table 3Table 3. With this policy, a UE connected to both WLAN and 3GPP will route voice traffic to 3GPP and browsing to WLAN. If the UE is not connected to WLAN, then the UE will route both voice and browsing over 3GPP.

Compromise Solution Overview

In the compromise solution 2 the UE does access selection according to rules specified in RAN specifications which indicate when the UE should go to WLAN and when the UE should go to 3GPP. In the rule, the UE is comparing measured metrics, e.g. 3GPP and WLAN signal strengths, with thresholds signalled from RAN.

RAN Rule Example for LTE:

```
if (measuredRsrp < threshRsrpLow) && (measuredRcpi > threshRcpiHigh) {
    goToWlan( );
} else if (measuredRsrp > threshRsrpHigh) || (measuredRcpi < threshRcpiLow) {
    goTo3gpp( );
}
```

When the UE's measured RSRP is below threshRsrpLow and the measured RCPI exceeds threshRcpiHigh, the UE would go to WLAN. When the UE's measured RSRP exceeds threshRsrpHigh or the measured RCPI is below threshRcpiLow, the UE would go to 3GPP.

The RAN will also indicate which WLANs should be considered by the UE when evaluating the RAN rule. This could for example be a list of WLANs provided to the UE. It is also be possible to have different RAN-lists for different sets of thresholds to provide WLAN distinction if deemed necessary.

The compromise solution 2 can be designed such that for offloading from 3GPP to WLAN the UE offloads only part of its traffic. This can be realized by the RAN indicating whether a bearer is eligible for WLAN offloading or not (e.g. during bearer setup and bearer modification)(Several factors such as the QCI of the bearer, radio conditions, etc. can be considered when deciding whether a bearer is eligible or not for offloading.) and the UE steering only the traffic of the eligible bearers . . . . Interworking between ANDSF and compromise solution One area which has not yet been captured in sufficient detail in the TR is how the RAN solution and ANDSF should interwork. In this section, we present how the compromise solution 2 and ANDSF can co-exist. It is assumed that the UE is dual connection capable, i.e. that it can connect to 3GPP and WLAN simultaneously.

WLAN Selection

The UE has different inputs of which WLANs should be considered:

User preference—For example, the user's home WLAN.
WLANSP—WLANs indicated by an ANDSF policy, which also may contain priorities between WLANs.
RAN-list—RAN can provide a list of WLANs which should be considered in the RAN rules.

Consider, for example, a UE configured with the WLANs shown in Table 4.

TABLE 4

Example of considered WLANs.

| Source | WLAN |
| --- | --- |
| User preference | WLAN A |
|  | WLAN B |
| WLANSP | WLAN C - Priority 1 |
|  | WLAN D - Priority 2 |
| RAN-list | WLAN D |
|  | WLAN E |

As it has been agreed in RAN2 #83 that the end-user preference should take precedence, the priority between the WLANs for the example above would then be as follows:

Prio 6. WLAN A
Prio 7. WLAN B
Prio 8. WLAN C
Prio 9. WLAN D
Prio 10. WLAN E

This means the UE will first try to find and connect to WLAN A, otherwise it will try to find and connect to WLAN B, and so on. We assume that typically the operator will populate the "WLANSP" and "RAN list" with exactly the same entries. However, in the roaming case, prioritizing WLANs provided by the WLANSP over those in the RAN-list allows the home operator to provide a specific set of WLAN APs to be used in the visited area. As an example, consider an operator X from North America that has an agreement with a WLAN operator A in Europe and an operator X's UE is roaming in operator's Y network in Europe. Even if Y doesn't have an agreement with A, X might still want to offload the UE to WLAN A whenever the possibility arises.

The UE should apply the RAN rule only to the WLANs under RAN control, i.e. to the WLANs in the RAN-list, but not to other WLANs, e.g. user preferred WLANs or WLANS in the WLANSP which are unknown to RAN. In the example above, this means the UE will apply the RAN rule on WLAN D and E but not on WLAN A, B or C.

In the example above, if the UE is in the coverage area of WLAN A, it will try to connect to WLAN A. Otherwise, it will try with WLAN B and then WLAN C. If none of these WLANs are found, the UE will apply the RAN rules on WLAN D. If the RAN rule are fulfilled for WLAN D, the UE will connect to it. If the RAN rules are not fulfilled for WLAN D, the UE will evaluate the RAN rule to see whether it should connect to WLAN E or not.

Selecting which Traffic to Move

When the UE performs offloading to WLANs under RAN control (i.e. WLANs which are in the RAN-list) and the RAN has indicated which bearers are eligible for offloading and which are not, the UE will steer the traffic according to these indicators. If such indicators are not provided to the UE, the UE can apply ISRP if present. If no RAN indicators or ISRP is provided, then the UE will steer all its bearers to WLAN.

The traffic indicators are not applicable for WLANs which are not under RAN control, i.e. in our example above, if the UE performs offloading to WLAN A, B or C the UE does not apply any traffic indicators from RAN the UE could apply ISRP for these WLANs if applicable.

Flow

Based on the above discussion the interworking between ANDSF and the compromise solution is in this section explained in more detail.

See FIG. 3: Interworking between RAN compromise solution 2 and ANDSF

First the UE selects a WLAN out of the WLANs which has been detected (not yet connecting to the WLAN). The UE selects WLAN in order of priority.

The UE will then see if the selected WLAN is "RAN-controlled/steered", i.e. if the WLAN is in the RAN-list. If this is the case the UE will proceed to evaluate the RAN rules, e.g. radio power levels in comparison to threshold values/levels. However, if the selected WLAN is not RAN controlled, e.g. if it is an end-user preferred WLAN, the UE will connect to the selected WLAN.

For RAN-controlled WLANs the UE would evaluate the RAN-rules to see if the thresholds for moving to WLAN are met. If so, the UE connects to the selected WLAN. If the thresholds are not met, the UE would start over and select another WLAN according to the WLAN priority order.

After the UE has connected to a RAN controlled WLAN, the UE can steer its traffic to the WLAN. If the RAN has indicated, e.g. by means of the markings, to the UE which bearers are eligible for offloading and which are not, the UE would steer the traffic accordingly. Otherwise the UE would apply ISRP rules, and if such rules are not provided, all the UE's traffic will be steered to WLAN

EXAMPLES

Based on the examples above the UE had the following WLANs and priorities.

| Priority | WLAN | In RAN-list |
| --- | --- | --- |
| 1 | WLAN A | No |
| 2 | WLAN B | No |
| 3 | WLAN C | No |
| 4 | WLAN D | Yes |
| 5 | WLAN E | Yes |

Below we look at what would happen in two different scenarios.

See FIG. 4: Example scenario 1

In this scenario the UE is in coverage of WLAN B, WLAN D and WLAN E. Which means that the UE would have the following WLAN priority list:

| Priority | WLAN | In RAN-list |
|----------|--------|-------------|
| 1 | WLAN A | No |
| 2 | WLAN B | No |
| 3 | WLAN C | No |
| 4 | WLAN D | Yes |
| 5 | WLAN E | Yes |

The UE would select the highest priority WLAN, i.e. WLAN B. Since this WLAN is not in the RAN-list the UE would then connect to WLAN B.

See FIG. 5: Example scenario 2

In this scenario the UE is in coverage of WLAN D and WLAN E. Note that the UE is in a location where the RCPI threshold for connecting to WLAN D is not fulfilled.

| Priority | WLAN | In RAN-list |
|----------|--------|-------------|
| 1 | WLAN A | No |
| 2 | WLAN B | No |
| 3 | WLAN C | No |
| 4 | WLAN D | Yes |
| 5 | WLAN E | Yes |

The UE would first select WLAN D as this has the highest priority. As WLAN D is in the RAN-list the UE would evaluate if the thresholds are fulfilled for entering WLAN D, but since this is not the case the UE would select the next WLAN in the priority order, i.e. WLAN E. The UE would evaluate if the thresholds are fulfilled for entering WLAN E. As the thresholds are fulfilled UE would connect to WLAN E.

When the UE has connected to WLAN E the UE would steer the bearers indicated by the RAN, if such indications has been received. Otherwise the UE would apply ISRP.

From the above discussion and examples, it can be seen that basic interworking between the compromise RAN solution and ANDSF can be assured without requiring any changes to ANDSF. Thus, we propose:

It is proposed that RAN2 agrees that interworking between the compromise RAN solution 2 and ANDSF can be assured without necessarily requiring any changes to ANDSF by following the prioritization procedure described above.

RAN2 is kindly asked to capture the interworking aspects described above in the TR.

CONCLUSION

In this contribution, the details of the interworking between ANDSF and the compromise RAN solution 2 were discussed. Based on the discussion, we propose:

Proposal 1

It is proposed that RAN2 agrees that interworking between the compromise RAN solution 2 and ANDSF can be assured without necessarily requiring any changes to ANDSF by following the prioritization procedure described above.

Proposal 2

RAN2 is kindly asked to capture the interworking aspects described above in the TR.

The invention claimed is:

1. A method, performed by a wireless device, for managing selection of a Wireless Local Area Network (WLAN), the wireless device being located in a cell operated by a radio network node of a Third Generation Partnership Project (3GPP) cellular communication system, wherein the method comprises:

obtaining at least one of a first sub-set of WLAN identifiers, wherein the first sub-set relates to user preference for selection of a WLAN, and a second sub-set of WLAN identifiers, wherein the second sub-set relates to WLAN Selection Policy;

receiving, from the radio network node, a third sub-set of WLAN identifiers, wherein the third sub-set relates to a list of WLANs to be considered by the wireless device when evaluating Radio Access Network (RAN) rules, wherein at least one of the RAN rules is based on a signal strength measured by the wireless device;

wherein each of the at least one of the first and the second sub-sets and the third sub-set is associated with a respective priority level for indicating which WLAN to prioritize over the other WLANs of the at least one of the first and the second sub-sets and the third sub-set;

selecting a WLAN from among the first, the second and the third sub-sets of WLAN identifiers based on the respective priority levels;

when the selected WLAN is from the third sub-set, evaluating the RAN rules in view of the selected WLAN, wherein the RAN rules indicate when the wireless device goes to the selected WLAN and when the wireless device goes to the 3GPP cellular communication system; and connecting to the selected WLAN when the RAN rules are fulfilled.

2. The method according to claim 1, wherein the selection of the WLAN is performed while WLANs from the first sub-set take precedence over WLANs of the second and the third sub-sets.

3. The method according to claim 1, wherein the selection of the WLAN is performed while WLANs from the second sub-set take precedence over WLANs of the third sub-set.

4. The method according to claim 1, wherein the wireless device is provided with a plurality of WLAN identifiers in the third sub-set, wherein a first WLAN of the third sub-set has a respective priority level that is higher than a WLAN of the second sub-set, while a second WLAN of the third sub-set has a respective priority level that is lower than the WLAN of the second sub-set.

5. The method according to claim 1, wherein the respective priority level comprises an associated priority between WLANs within at least one of the first, the second and the third sub-sets.

6. The method according to claim 1, wherein the RAN rules comprises at least one of access selection and traffic steering rules.

7. The method according to claim 1, wherein the evaluation of the RAN rules comprises:

when the wireless device's measured signal strength of the 3GPP cellular communication system is below a first threshold and the wireless device's measured signal strength of WLAN exceeds a second threshold, going to the selected WLAN; and when the wireless device's measured signal strength of the 3GPP cellular communication system exceeds a third threshold or the wireless device's measured signal strength of WLAN is below a fourth threshold, going to the 3GPP cellular communication system.

8. The method according to claim 7, wherein a signal strength of RAN is Reference Signal Received Power (RSRP) or Received signal code power (RSCP) and signal strength of WLAN is received channel power indicator (RCPI) or received signal strength indicator (RSSI).

9. A wireless device configured to manage selection of a Wireless Local Area Network (WLAN), the wireless device being located in a cell operated by a radio network node of a Third Generation Partnership Project (3GPP) cellular communication system, wherein the wireless device comprises:
- a memory for storing instructions therein;
- a processor which, when executing the instructions, causes the wireless device to:
  - obtain at least one of a first sub-set of WLAN identifiers, wherein the first sub-set relates to user preference for selection of a WLAN, and a second sub-set of WLAN identifiers, wherein the second sub-set relates to WLAN Selection Policy;
  - receive, from the radio network node, a third sub-set of WLAN identifiers, wherein the third sub-set relates to a list of WLANs to be considered by the wireless device when evaluating Radio Access Network (RAN) rules, wherein at least one of the RAN rules is based on a signal strength measured by the wireless device;
  - wherein each of at least one of the first and the second sub-sets and the third sub-set is associated with a respective priority level for indicating which WLAN to prioritize over the other WLANs of the at least one of the first and the second sub-sets and the third sub-set;
  - select a WLAN from among the first, the second and the third sub-sets of WLAN identifiers based on the respective priority levels;
  - when the selected WLAN is from the third sub-set, evaluate the RAN rules in view of the selected WLAN, wherein the RAN rules indicate when the wireless device goes to the selected WLAN and when the wireless device goes to the 3GPP cellular communication system; and
  - connect to the selected WLAN when the RAN rules are fulfilled.

10. The wireless device according to claim 9, wherein the instructions, when executed by the processor, further cause the wireless device to select the selected WLAN while WLANs from the first sub-set take precedence over WLANs of the second and the third sub-sets.

11. The wireless device according to claim 9, wherein the instructions, when executed by the processor, further cause the wireless device to select the selected WLAN while WLANs from the second sub-set take precedence over WLANs of the third sub-set.

12. The wireless device according to claim 9, wherein the instructions, when executed by the processor, further cause the wireless device to be provided with a plurality of WLAN identifiers in the third sub-set, wherein a first WLAN of the third sub-set has higher priority than a WLAN of the second sub-set, while a second WLAN of the third sub-set has lower priority than the WLAN of the second sub-set.

13. The wireless device according to claim 9, wherein the respective priority level comprises an associated priority between WLANs within at least one of the first, the second and the third sub-sets.

14. The wireless device according to claim 9, wherein the RAN rules comprises access selection and/or traffic steering rules.

15. The wireless device according to claim 9, wherein the instructions, when executed by the processor, further cause the wireless device to:
- when the wireless device's measured signal strength of the 3GPP cellular communication system is below a first threshold and the wireless device's measured signal strength of WLAN exceeds a second threshold, go to the selected WLAN; and
- when the wireless device's measured signal strength of the 3GPP cellular communication system exceeds a third threshold or the wireless device's measured signal strength of WLAN is below a fourth threshold, go to the 3GPP cellular communication system.

16. The wireless device according to claim 15, wherein a signal strength of RAN is Reference Signal Received Power (RSRP) or Received signal code power (RSCP) and signal strength of WLAN is received channel power indicator (RCPI) or received signal strength indicator (RSSI).

17. A non-transitory machine-readable storage medium having instructions stored therein, which when executed by a processing circuit of a wireless device, causes the processing circuit to perform operations comprising:
- obtaining at least one of a first sub-set of Wireless Local Area Network (WLAN) identifiers, wherein the first sub-set relates to user preference for selection of a WLAN, and a second sub-set of WLAN identifiers, wherein the second sub-set relates to WLAN Selection Policy;
- receiving, from a radio network node, a third sub-set of WLAN identifiers, wherein the third sub-set relates to a list of WLANs to be considered by the wireless device when evaluating Radio Access Network (RAN) rules, wherein at least one of the RAN rules is based on a signal strength measured by the wireless device;
- wherein each of the at least one of the first and the second sub-sets and the third sub-set is associated with a respective priority level for indicating which WLAN to prioritize over the other WLANs of the at least one of the first and the second sub-sets and the third sub-set;
- selecting a WLAN from among the first, the second and the third sub-sets of WLAN identifiers based on the respective priority levels;
- when the selected WLAN is from the third sub-set, evaluating the RAN rules in view of the selected WLAN, wherein the RAN rules indicate when the wireless device goes to the selected WLAN and when the wireless device goes to a Third Generation Partnership Project (3GPP) cellular communication system; and
- connecting to the selected WLAN when the RAN rules are fulfilled.

18. The non-transitory machine-readable storage medium of claim 17, wherein the selection of the WLAN is performed while WLANs from the first sub-set take precedence over WLANs of the second and the third sub-sets.

19. The non-transitory machine-readable storage medium of claim 17, wherein the selection of the WLAN is performed while WLANs from the second sub-set take precedence over WLANs of the third sub-set.

20. The non-transitory machine-readable storage medium of claim 17, wherein the evaluation of the RAN rules comprises:
- when the wireless device's measured signal strength of the 3GPP cellular communication system is below a first threshold and the wireless device's measured signal strength of WLAN exceeds a second threshold, going to the selected WLAN; and
- when the wireless device's measured signal strength of the 3GPP cellular communication system exceeds a third threshold or the wireless device's measured signal strength of WLAN is below a fourth threshold, going to the 3GPP cellular communication system.

* * * * *